United States Patent [19]
Brandt

[11] 4,306,752
[45] Dec. 22, 1981

[54] WESTINGHOUSE AIR BRAKE SYSTEM
[76] Inventor: Cecil R. Brandt, P.O. Box 35, Westfield, Ill. 62474
[21] Appl. No.: 126,188
[22] Filed: Mar. 3, 1980
[51] Int. Cl.³ .................................................. B60T 13/68
[52] U.S. Cl. ........................................................ 303/15
[58] Field of Search ............... 303/3, 9, 15, 37, 38, 303/43, 44

[56] References Cited
U.S. PATENT DOCUMENTS
591,262 10/1897 Park ........................................ 303/15
1,400,639 12/1921 Thomas ................................. 303/15
1,776,300 9/1930 Thomas ................................. 303/15
1,909,403 5/1933 Hinman .............................. 303/15 X Primary Examiner—Duane A. Reger
Attorney, Agent, or Firm—Albert L. Jeffers; Roger M. Rickert

[57] ABSTRACT

Locomotive air brake system in which each individual car has a solenoid actuable dump valve for substantially simultaneous dumping of air to enhance causing of simultaneous braking of each car.

2 Claims, 6 Drawing Figures

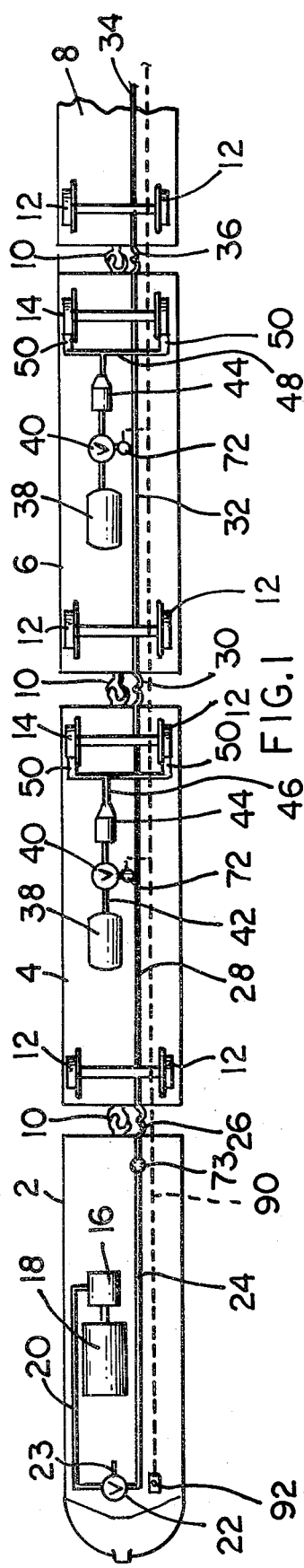
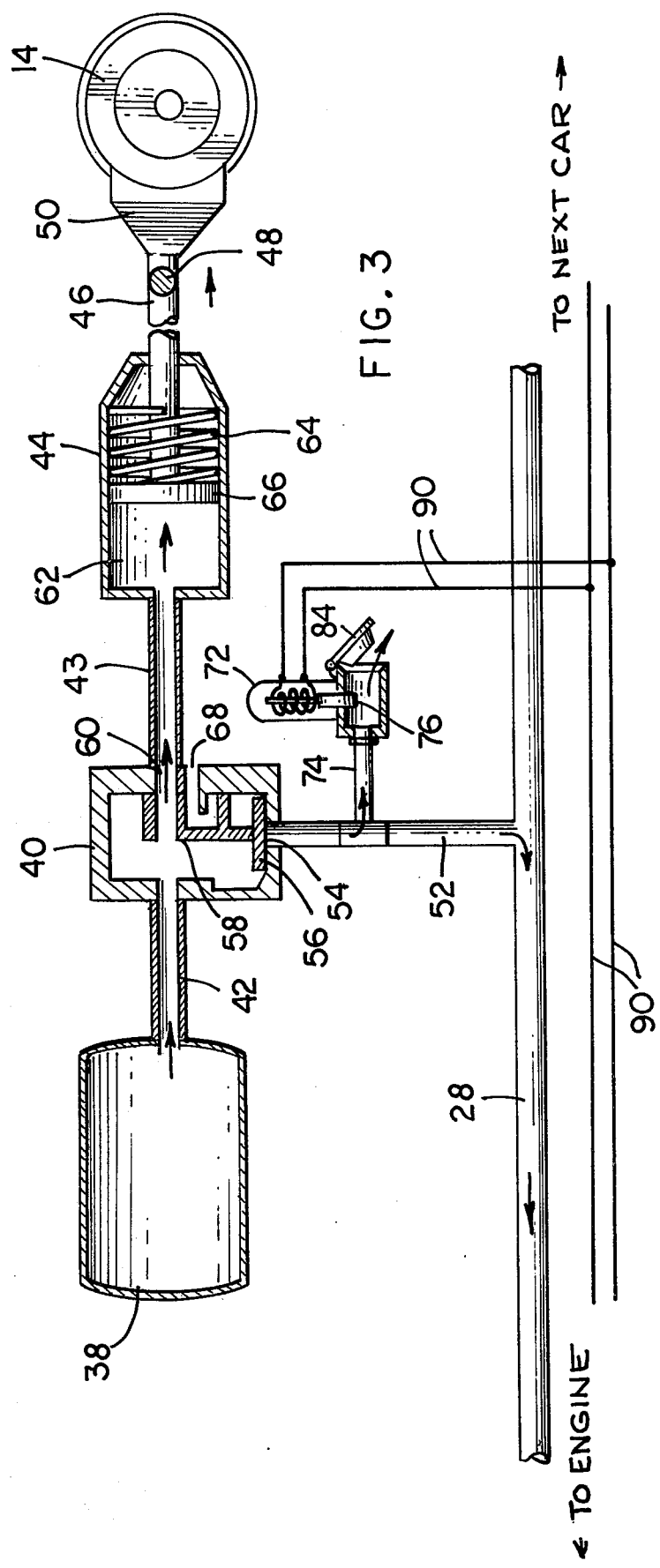

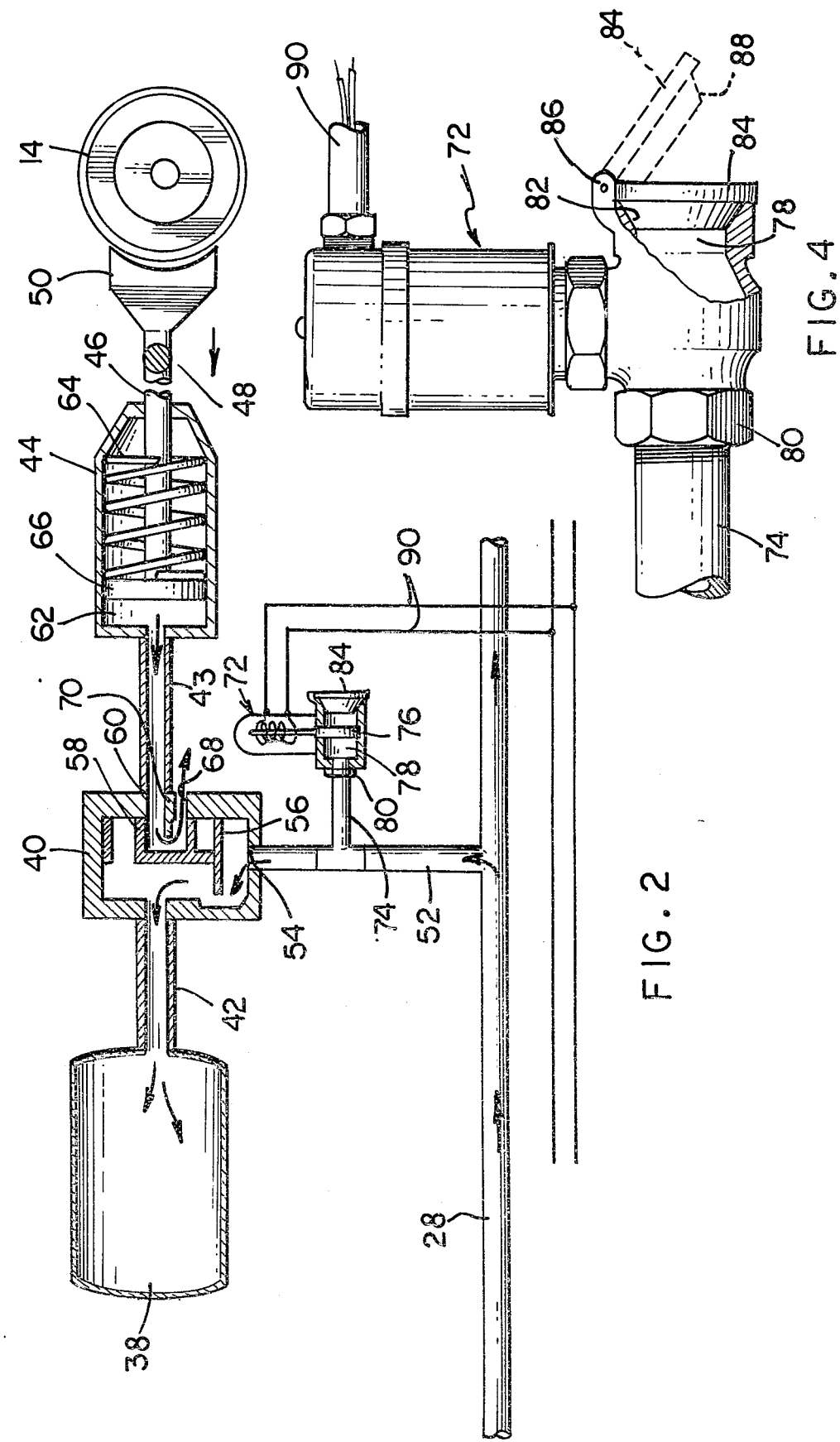

WESTINGHOUSE AIR BRAKE SYSTEM

BACKGROUND OF THE INVENTION

Heretofore difficulties have been encountered in brake systems for engine pulled cars, such as freight cars, flat-bed cars, refrigerator cars and the like. The air brake systems for such prior art cars are actuated from the engine. When emergencies arose, the engineer in the engine cabin would actuate the air brake systems in order to cause the brake shoes to engage the wheels of the individual cars. Experience has indicated, however, where derailments did occur, that the individual car air brake systems which were actuated from the cabin did not perform the desired function of braking each car simultaneously because of the interaction or dependent flow of air from each of the cars. It is understood that in wrecks of trains, piling up or leaving the track of the end group of cars was substantially the direct result of the fact that the air brake system did not function sufficiently to automatically exhaust air from each car to brake each car almost simultaneously.

Many years ago when short lightweight trains were pulled, the air braking system was adequate, however, today with the modern lengthy trains and powerful engines, the brake system needs improvement. When the engineer sees the need for a quick stop, the air simply won't release sufficiently quickly and ideally should release in about one-tenth the time presently required. The railways are required to employ air braking system, however, this requirement is not adequate to avoid head-on, rear end and road crossing wrecks where life is endangered and damage to railroad property runs into the billions of dollars. The need for faster stopping is very necessary to protect left and limb.

SUMMARY OF THE INVENTION

In accordance with the present invention, the aforementioned difficulty and disadvantages of the prior art are substantially overcome by the provision of an air brake system including a normally closed electrically actuable valve means for quick release of air from the central or main air valve means of the prior art individual car air brake system to cause opening of said main or central air valve means and thereby to permit flow of air from the conventional air brake system of each car substantially simultaneously, whereby the brake shoe means of each of said cars is caused to engage with the corresponding wheel thereby to cause each of the train cars to brake substantially simultaneously and thereby prevent piling up of cars under emergency braking conditions.

It is thereby an object of the present invention to provide new and improved air brake systems for railroad cars and more particularly to provide a valve arrangement for such systems which rapidly dumps air from the system to apply the brakes.

It is another object ot provide air brake systems, for railroad cars releasably coupled in tandem which substantially simultaneously brake in response to an electrical signal generated from the engine of the train.

Another object of the present invention is to provide such an air brake system which includes normally closed electrically actuable control air valve means for quick release of the air from the conventional air brake system thus causing the engagement of the brake shoe means with the corresponding wheels of said railroad car to stop movement of the car.

A further object of the present invention is to provide an air brake system which includes normally closed solenoid valve means actuable to permit flow of air from the conventional, main brake shoe valve means to atmosphere to cause opening automatically of the normally closed main air valve means. The solenoid valve means may be inserted into conventional air brake systems by placing a T in the air line near the car coupling hose.

A still further object of the present invention is to provide such normally closed control solenoid valve means which incorporate an outlet for quick release of air to actuate the braking function having normally closed end closure means, said end closure means being pivotally mounted to said solenoid valve means to open when the control valve opens.

A further object of the present invention is to provide an air brake system having such valve end closure means having a frustoconical protrusion movably seatable in the corresponding outlet of said electrically actuable valve means responsive to air pressure for movement to allow escape of air from said valve means to atmosphere, the valve end closure being normally closed to prevent the entry of dirt into the valve and opening only when the valve opens to dump air from the brake system.

These and other objects, features and advantages of this invention and the manner of attaining them will become more apparent and the invention itself will be best understood by reference to the following description of an embodiment of the invention taken in conjunction with the accompanying drawing wherein like reference numerals refer to like and corresponding parts throughout the several views.

DESCRIPTION OF THE DRAWING

FIG. 1 is a schematic top view illustrating a train with the engine and cars coupled in tandem and incorporating an air brake system of the present invention;

FIG. 2 is a schematic side view in partial section illustrating a car air brake system of the present invention, and showing the brake shoe disengaged from the wheel;

FIG. 3 is a view similar to FIG. 2 but showing the brake shoe engaging the wheel;

FIG. 4 is an enlarged side view in partial section of electrically actuable control dump valve means of the present invention shown in FIGS. 2 and 3.

DESCRIPTION OF THE PREFERRED EMBODIMENT

Figure 5:
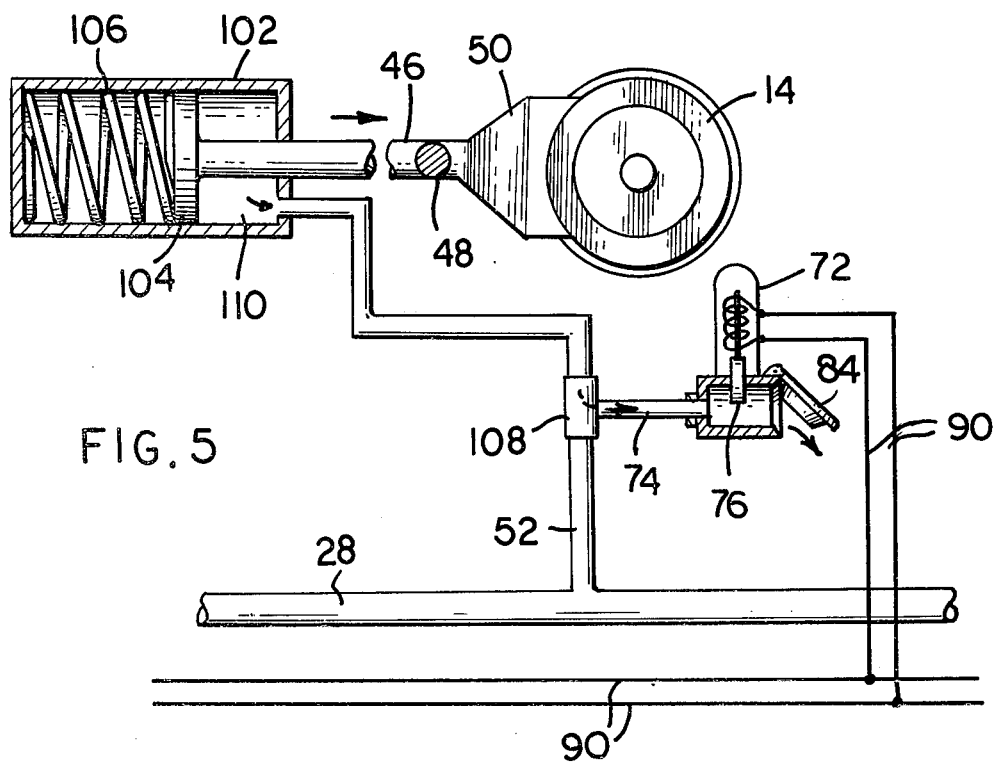
FIGS. 5 and 6 are schematic side views in partial section illustrating an alternate braking system employing the present invention.

Referring to FIG. 1 there is illustrated a railroad engine 2 and a plurality of railroad cars 4, 6 and 8 coupled in tandem as by conventional couplers 10. As illustrated, the cars include front wheels 12 and rear wheels 14, it being understood that most conventional railroad cars have four wheels at each end of the car.

The engine and cars include a composite compressed air brake system including a main compressor 16 in the engine 2 driven by a conventional motor 18. The compressor 16 supplies compressed air along a conduit such as air pipe 20 to a normally closed air venting or dumping valve 22 in the engine which is hand-operated, as by a lever 23, by the personnel operating the engine 2. The air downstream of the valve 22 passes through an initial air flow pipe 24 carried by the engine 2 for supply through a flexible, quick disconnect air hose coupling 26 to a corresponding air flow pipe 28 carried by the first car 4. Similarly, the air flows from the air flow pipe 28 to a quick disconnect air hose coupling 30 from car 4 to a pipe 32 carried by car 6. An air flow pipe 34 of car 8 is coupled to pipe 32 by a quick disconnect coupling 36. The other cars in the train (not shown) also are supplied air through conduits and quick disconnect hose couplings, such as pipes 24, 28 and 32 and couplings 26, 30 and 36.

Each of the cars 4, 6, 8 and subsequent cars (not shown) have an individual air brake system or unit which are supplied air by such as the pipes 28, 32, 34 through branch lines described hereinafter.

The individual car air brake systems or units each includes, in general, an air accumulator 38, a first or main valve means 40 in fluid communication with the accumulator 38 through the branch line 42 and valve means 40 is in fluid communication with an air brake cylinder means 44. The air brake cylinder means 44 operates a piston rod 46 which carries a crossbar 48. The crossbar 48 carries at its opposite ends wheel brake shoes 50 for engagement with the corresponding wheels 12 or 14. A further brake actuating mechanism (not shown) may extend between the set of wheels at one end of the car and the set at the other end for the simultaneous actuation of additional brake shoes, as is common in this art.

Referring to FIG. 2, the car air brake system first valve means 40 is connected to the main air line 28 through a branch conduit such as pipe 52 for supply of compressed air through the inlet 54 into the main valve means 40. As shown, the compressed air fills or charges the accumulator 38 having main valve means 40 and thus causes the valve piston 56 to unseat from the inlet 54 to permit additional air flow from the pipe 52, as shown in FIG. 3, into the valve means 40.

When a train is coupled together and preparing to move, the compressor 16 builds up the air pressure in the air lines, such as pipe 28, and the valve piston 56 assumes the position illustrated in FIG. 2 so that air may be pumped into accumulator 38 on each car. When the air pressure stabilizes at a desired level, the train is ready to move. During this process and at all times when the air pressure in line 28 remains at this stable level, the valve piston 56 remains in the position illustrated in FIG. 2 and provides a venting pathway to the atmosphere from chamber 62 by way of conduit 43 and passageway 68, however, the inlet 60 of the air brake cylinder 44 is not connected to the higher pressure air when the valve piston is in this position.

Means, such as spring means 64, bias the piston head 66 carried by the brake shoe shaft 46 towards the valve means 40 to maintain the brake shoe 50 normally disengaged from the wheel 14.

When braking is desired, the air pressure in pipe 28 is lowered by the engineer and the valve piston 56 moves from the position illustrated in FIG. 2 to the position illustrated in FIG. 3 to provide a pathway for air from accumulator 38 to chamber 62 to force piston 66 against the normal biasing force of spring 64 and to engage the brake shoe 50 with the wheel 14. A subsequent increase in the pressure in pipe 28 forces valve piston 56 back to the position illustrated in FIG. 2 for repressurizing the accumulator 38 and venting chamber 62 to the atmosphere so that spring 64 may relieve the braking action.

The main valve means 40 may comprise a known servo-piston operated "triple valve".

In accordance with the present invention normally closed electrically actuable solenoid valve means, generally indicated by the numeral 72, are disposed on each car so as to control, when desired, air flow through the branch pipe or conduit 52. In practice, this valve will be located near the end of a car where the brake cylinder is located close to the air coupling hose and hand operated cut-off valve by placing a "T" in the air pipe. For this purpose, the normally closed electrically actuable valve means 72 include an air conduit such as pipe 74 which is connected to pipe 52. The normally closed electrically actuable valve means 72 comprises solenoid means having a valve head 76 (FIG. 2) controlling flow of fluid from the chamber 78 of the valve means 72. The inlet 74 of the electrically actuable valve means 72 is preferably threadably connected as at 80 to the valve means 72 (FIG. 4).

In order to provide a fast air dump, the valve means 72 is provided opposite the inlet 74 with a chamfered annular surface 82 which provides a seat for a normally closed movable end closure means 84 (FIG. 4). The mating end closure means 84 is shown pivotally mounted as at 86 to the valve means 72. As shown, the female portion of the valve means 72 is frustoconical in shape as is the mating surface 88 of the end closure means 84. Surfaces 82 and 88 mate along a substantial distance when valve 72 is closed with the end closure 84 effectively preventing the entry of contaminants into chamber 78.

The electrical control for the solenoid valve means 72 is in response to and in circuit with an electrical system as indicated in FIG. 2 by the numeral 90 and actuable in the cabin of the engine 2 (FIG. 1), for example by a button 92 for opening of the dump valves 72, and thus, actuation of quick air release from the dump valves 72.

In practice, the electrical and air couplings may share a common conduit located near the center line of each car so that excessive slack is not required to compensate during turns.

Thus, in operation, the auxiliary air accumulators in each car brake system 38 are filled with air by the personnel in the engine, the air flowing through conduits 28 and 52 to cause the valve 56 of the main air valve means 40 to move from the position shown in FIG. 3 to that of the position shown in FIG. 2 thereby cutting off air flow to the brake cylinder chamber 62 and thereby permitting spring 64 to maintain the brake shoe 50 disengaged from the wheel 14.

It will be appreciated that under such circumstances each of the individual car air brake systems is ready for use to provide engagement of the brake shoe 50 with the corresponding wheel 14 to stop the movement of the cars substantially simultaneously. It is estimated that with this system an entire 100 car train may be brought to a halt from normal running speed in about 20 seconds or in about 50 feet.

When the personnel in the engine 20 determine that the train system should be stopped, two options are available. As is conventional, the lever 23 can be moved to the "brake" position, thereby preventing air pressure effects from being communicated from the main compressor 16 to the individual car air brake systems and lowering the air pressure in pipes such as 28 to set the brakes. The brakes may also be set by actuating electrical control 92 and the engineer may coordinate his actuation of this control 92 with the standard 80 psi air pressure indicator in the cab to achieve and desired controlled braking action.

To cause a quick release of the air pressure from the individual air brake systems of each car, as well as for normal braking, the engineer need only push the electrical actuator 92 which will immediately actuate each of the solenoid valve means 72, which are in electrical circuit with each other, on each of the cars to cause, in effect, an automatic dumping of air from each of the brake cylinders lines 52 which will, in turn, cause closing of the valves 56 of the first valve means 40 to the position shown in FIG. 3 thereby permitting compressed air to flow from the accumulator 38 through valve means 40 to the brake cylinder 44 which, in turn, acts against the force of the spring 64 and the piston head 66 to move the brake shoe 50, of each car, relatively simultaneously to engage the corresponding wheel 14 and thereby substantially reducing the speed of the train cars relatively uniformly and permitting ready stoppage of the train cars, each car air brake system contributing to the uniform stoppage of the train system. A normally open valve 73 may also be provided to close when valves 72 open to block the needless escape of air from the engine air system.

It will be appreciated that opening of the normally closed solenoid valve system 72 permits rapid dumping of the pressurized air accumulated in the normally closed first valve means 40 and accumulator 38 and accelerated actuation thereby of the total overall air brake system.

Figure 6:
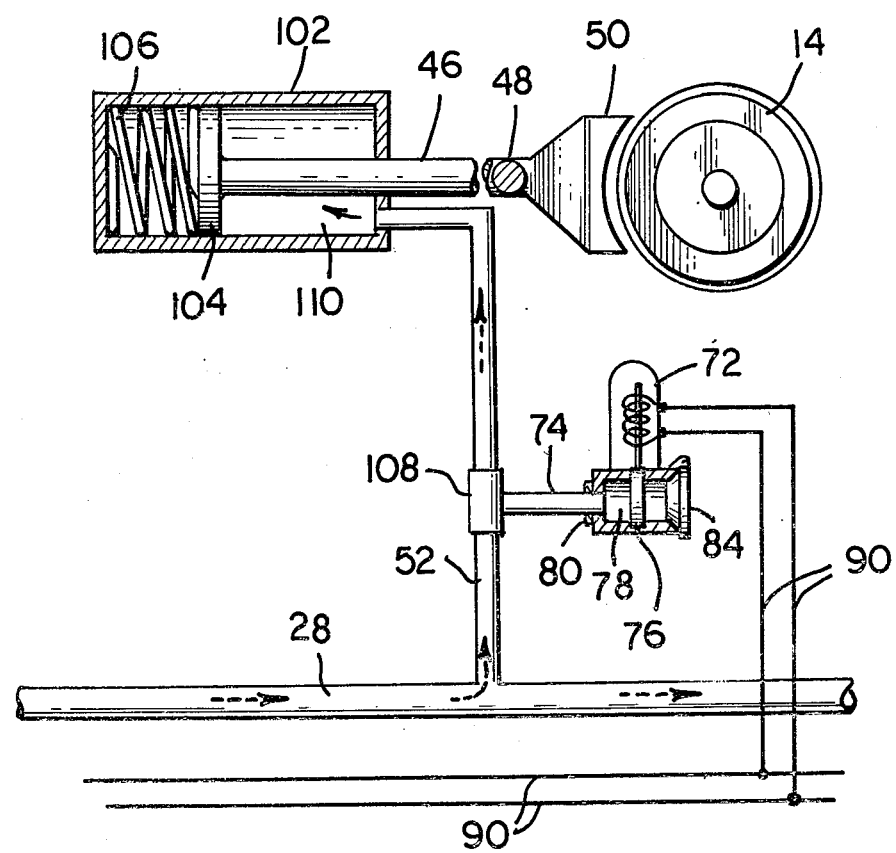

Referring now to FIGS. 5 and 6 wherein another form of the air brake system is illustrated, numerous components are identical to or similar to those previously discussed and are identified with like reference numerals. Brake cylinder 102 is coupled by way of piston rod 46 to brake shoe 50 with piston 104 being normally biased by spring 106 so as to engage brake shoe 50 with wheel 14. Air from the engine compressed air source is distributed by pipes 28 to each car and each car has pipe 52 coupling this air source to brake cylinder 102 by way of a T connection 108. As previously discussed, this T connection by way of pipe 74 is connected to the electrically actuable valve 72. When pressure is maintained in line 28 and therefore also in the brake cylinder chamber 110, piston 104 is urged against the normal biasing of spring 106 so as to hold the brake shoe 50 away from wheel 14, as illustrated in FIG. 6. Upon a remote command, initiated by actuating switch 92, each of the parallel connected valves 72 is actuated to open and vent air to the atmosphere, thereby lowering the pressure in pipe 28, as well as the pressure in chamber 110. As this pressure in chamber 110 drops, spring 106 urges shoe 50 into engagement with wheel 14, as illustrated in FIG. 5.

Electrical actuation of the valves 72 may thus be thought of as fooling each car brake system into thinking that the car has become uncoupled so that the brakes are immediately set. With the system of FIGS. 5 and 6, the brakes on a decoupled car are automatically set and it is contemplated that a mechanical brake lockout system will be provided so that cars may be individually moved as well as "dropped" in the manner common within the railroad industry. It is also contemplated that a more elaborate valving arrangement in conjunction with air accumulation tanks may be provided so as to reduce the time required for releasing the brakes when air pressure has been totally vented from the air distribution system.

While there have been disclosed particular embodiments of the present invention, other embodiments will become readily apparent to one skilled in the art and, accordingly, this invention should be considered to be limited in scope only by the accompanying claims.

What is claimed is:

1. In an air brake system adapted for railroad cars releasably coupled in tandem including an air brake unit for each car having a brake cylinder means with brake shoe means for wheels of each of said cars, the brake cylinder means having piston rod means connected to said brake shoe means and to piston means in said cylinder means with means normally biasing said piston means and brake shoe means away from engagement with said wheel, first valve means for controlling flow of compressed air from a source to said brake cylinder means, said first valve means being normally biased to closed position to prevent air flow through said valve means to said brake cylinder means, an air accumulator in open communication with said first valve means for supply of air through said first valve means to said brake cylinder means to cause engagement of said brake shoe means with said wheel when said first valve means is opened, the improvement comprising normally closed electrically actuable valve means disposed in fluid communication with said first valve means to cause opening of said first valve means and thereby to permit flow of air from said accumulator through said first valve means to said brake cylinder means to cause engagement of said brake shoe means with said wheel, said electrically actuable valve means including an outlet with normally closed movable end closure means pivotally mounted to said electrically actuable valve means and responsive to air pressure in said valve means to permit escape of air from said valve means, the outlet of said electrically actuable valve means being frustoconical in shape and said end closure means including a mating frustoconical protrusion movably seated in said outlet, said electrically actuable valve means including solenoid means actuable to permit flow of air from said first valve means by way of the electrically actuable valve means and end closure to atmosphere.

2. The system of claim 1 wherein said electrically actuable valve means is disposed between said source and said first valve means.

* * * * *